United States Patent
Damitz et al.

(10) Patent No.: US 7,260,470 B2
(45) Date of Patent: Aug. 21, 2007

(54) METHOD FOR CALIBRATION OF THE CYLINDER SENSORS SUITE ON AN INTERNAL COMBUSTION ENGINE WITH INDIVIDUAL CYLINDER OPERATION IN PARTICULAR IN A MOTOR VEHICLE

(75) Inventors: Jens Damitz, Illingen (DE); Dirk Samuelsen, Ludwigsburg (DE); Ruediger Fehrmann, Leonberg (DE); Matthias Schueler, Steinheim-Hoepfigheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/525,179

(22) PCT Filed: May 26, 2003

(86) PCT No.: PCT/DE03/01713

§ 371 (c)(1), (2), (4) Date: Mar. 17, 2006

(87) PCT Pub. No.: WO2004/022951

PCT Pub. Date: Mar. 18, 2004

(65) Prior Publication Data

US 2006/0241852 A1    Oct. 26, 2006

(30) Foreign Application Priority Data

Sep. 3, 2002    (DE) ................. 102 40 492

(51) Int. Cl.
    F02D 41/14    (2006.01)
(52) U.S. Cl. .................. 701/114; 123/435; 73/1.59
(58) Field of Classification Search ............... 701/114, 701/101, 104; 123/FOR. 120, 435; 73/116, 73/118.1, 117.2, 117.3, 35.02, 35.12, 1.59
See application file for complete search history.

(56) References Cited

U.S. PATENT DOCUMENTS

| 4,744,244 A | | 5/1988 | Tanaka ................... 73/115 |
| 5,276,625 A | * | 1/1994 | Nakaniwa ................. 701/111 |
| 6,549,843 B1 | * | 4/2003 | Koerner .................. 701/104 |

FOREIGN PATENT DOCUMENTS

| DE | 197 49 814 | 5/1999 |
| DE | 199 45 618 | 3/2001 |
| DE | 101 59 017 | 6/2003 |
| EP | 0 115 317 | 8/1984 |

(Continued)

*Primary Examiner*—Willis R. Wolte
*Assistant Examiner*—Johnny H. Hoang
(74) *Attorney, Agent, or Firm*—Kenyon & Kenyon LLP

(57) ABSTRACT

A method for calibrating at least two sensors for sensing a variable characterizing the combustion process in an internal combustion engine of a motor vehicle, operated in individual-cylinder fashion and having at least two cylinders, is provided. According to the present invention, at least one operating point of the internal combustion engine, at which an equalization of the at least two cylinders by at least one fuel quantity equalization method is performable with high accuracy, is determined. At the at least one operating point of the internal combustion engine, an equalization of the at least two cylinders is performed by the at least one fuel quantity equalization method. After the equalization of the at least two cylinders has been accomplished, at least one sensor parameter of the at least two sensors is mutually adjusted.

17 Claims, 3 Drawing Sheets

FOREIGN PATENT DOCUMENTS

| | | |
|---|---|---|
| EP | 0 411 580 | 2/1991 |
| EP | 0 416 270 | 3/1991 |
| EP | 0 657 729 | 6/1995 |
| JP | 401106958 A * | 4/1989 |
| WO | WO 00 79113 | 12/2000 |

* cited by examiner

METHOD FOR CALIBRATION OF THE CYLINDER SENSORS SUITE ON AN INTERNAL COMBUSTION ENGINE WITH INDIVIDUAL CYLINDER OPERATION IN PARTICULAR IN A MOTOR VEHICLE

FIELD OF THE INVENTION

The invention relates in general to internal combustion engines of motor vehicles, operated in individual-cylinder fashion, and related in particular to a method for the calibration of sensors, disposed in at least two cylinders of such an internal combustion engine, for sensing a variable characterizing the combustion process in the respective cylinder.

BACKGROUND INFORMATION

Internal combustion engines operated in individual-cylinder fashion often have a so-called fuel quantity compensation control system (FQCC) or smooth-running control system (SRC) which is described, for example, in published German patent document DE 199 45 618. For this, a controller is associated with each cylinder of the internal combustion engine. The background for this action is that in the event of any quantity errors during fuel metering, an inherently undesirable torque nonuniformity occurs. If an increased quantity of fuel is metered to a cylinder as a result of tolerances, the FQCC causes a negative fuel quantity to be added to the operator-commanded quantity for that cylinder. Conversely, a positive fuel quantity is added when too small a fuel quantity is metered to a cylinder.

During operation of a diesel engine, by means of the two control systems (FQCC and SRC) any injection quantity errors that result in torque differences, and thus in nonuniform engine rotation speeds, can be corrected, and engine smoothness at low rotation speeds—which is known to be critical in diesel engines—can be substantially improved. In addition, the equalization of the cylinders caused by the correction allows emissions improvements to be achieved not only in the lower rotation-speed range relevant to smoothness, but also at higher engine speeds.

A fuel quantity equalization by means of an FQCC or SRC is not efficient in all operating ranges of a diesel engine, however, since depending on the type of engine, additional effects occur, such as torsional vibrations at the crankshaft, which moreover are highly dependent on rotation speed. Methods for individual-cylinder operation of an internal combustion engine have therefore also been proposed in which a direct evaluation is made of a signal (for example of the cylinder pressure) that is directly correlated with combustion. These methods allows cylinder equalization even at higher rotation speeds. In these methods, operating parameters of the combustion process, for example the mean pressure indicated in the individual cylinders or the torque corresponding thereto, or the center point of the pressure difference between the individual cylinders, are calculated from the cylinder pressure profile. By regulating the indicated mean pressure, it is thus possible to achieve a more precise individual-cylinder regulation of the setpoint torques, and thus a better equalization of the cylinders in all operating ranges.

In cylinder-pressure-based engine control systems, the cylinder pressures occurring during operation of the engine are measured by means of pressure sensors over time, or as a function of crank angle, and made available to an engine control system. A pressure sensor of this kind is described, for example, in published German patent document DE 197 49 814. Also known are methods with which parameters can be ascertained during engine operation from a high-resolution pressure signal and are in turn used for individual-cylinder optimization of the engine process in terms of the target variables of fuel economy, emissions, and smoothness. The parameters used are, for example, the pressure or pressure difference integrals, the indicated work, or the indicated torque.

Also disclosed, in the German patent application 101 59 017, is a similar method in which open-and/or closed-loop control of engine operating parameters is accomplished as a function of a variable derived from the actual pressure signal. This derived variable characterizes, for example, the change in the pressure signal or the combustion profile. This enables a very accurate correction of preinjection during engine operation.

The aforesaid individual-cylinder control operation is usually accomplished by means of positioners, disposed in or on the cylinders, that are triggered by way of individual-cylinder control variables. These control variables are, for example, the triggering durations and/or triggering onsets of an injection.

The cylinder-pressure-based methods have the disadvantage that the measured values supplied by the pressure sensors are often erroneous as a result of tolerances related to manufacture and/or operation. If these measurement errors are not corrected, they distort the calculated cylinder pressure values and, because of the aforesaid control operation, result in mistuning among the individual cylinders.

The aforesaid measurement errors are expressed in differing sensor parameters that are incorporated into sensor characteristic curves both as an erroneous offset and as an erroneous gain factor. Suggested solutions for calibrating or correcting the offset already exist, in which the pressure rise at the beginning of a compression phase of the internal combustion engine is evaluated. No methods so far exist, however, for calibrating or correcting any erroneous gain factors. The individual gain factors moreover play a higher-order role in the overall operation of an internal combustion engine, since they are directly involved in the calculation of many other cylinder pressure features as well.

It is therefore an object of the present invention to provide a method for the calibration of sensors, disposed in at least two cylinders of an internal combustion engine operating in individual-cylinder fashion, for sensing a variable characterizing the combustion process in the respective cylinder, that makes possible adjustment of the at least two sensors with greater precision.

SUMMARY

The method according to the present invention provides in a first step, in order to perform the aforesaid sensor adjustment, determining at least one operating point of the internal combustion engine at which an equalization of the cylinders in the aforesaid sense, using the fuel quantity equalization methods such as FQCC or SRC mentioned initially, is possible with relatively high precision. At this operating point, an equalization of the cylinders is then performed by means of at least one of the aforesaid fuel quantity equalization methods.

In an example embodiment, the operating points of the internal combustion engine selected can be those in which only small disturbing side effects, such as the previously mentioned torsional vibrations of the crankshaft or unequal combustion chamber/cylinder filling as a result of air mass fluctuations, are to be expected. One such operating point is the idle mode.

The first step according to the present invention is based on the recognition that in the context of an equalization of the cylinders by means of an aforesaid fuel quantity equalization method, it can be assumed that all cylinders are receiving the same injection quantity and are therefore supplying the same torque or the same mean pressure.

In a second step, the equalization achieved in the first step is utilized in order to mutually adjust at least one of the aforesaid sensor parameters of at least two pressure sensors. This step exploits the fact that the circumstances of the combustion process, e.g., of the internal cylinder pressure (mean pressure) or torque, occurring in different cylinders in the first step during operation of the internal combustion engine are identical to a first approximation, and that discrepancies in the operating parameters of the internal combustion engine sensed respectively by the sensors thus derive, to a first approximation, exclusively from erroneous sensor parameters, e.g., the gain factor and/or offset.

With the adjustment that may be performed during operation of the internal combustion engine, erroneous sensor parameters and characteristic curves can thus be corrected or calibrated in technically simple but nevertheless extremely efficient and precise fashion, thus effectively preventing any possible mistuning of the various cylinders of the internal combustion engine.

The relevant sensors here may be pressure sensors for sensing the internal cylinder pressure (mean pressure) occurring during combustion, and thus indirectly sensing the torque indicated by the combustion.

The result is that by means of the method according to the present invention, the pressure profiles in the cylinders and the calculated operating parameters in the internal combustion engine are adapted to one another by correcting the gain factor and/or the offset of individual sensors. Although the method does not permit absolute calibration of the sensors, it does allow relative adjustment of the sensors to each other, yielding an overall improvement in the individual-cylinder operation of the internal combustion engine.

DETAILED DESCRIPTION

Figure 1:
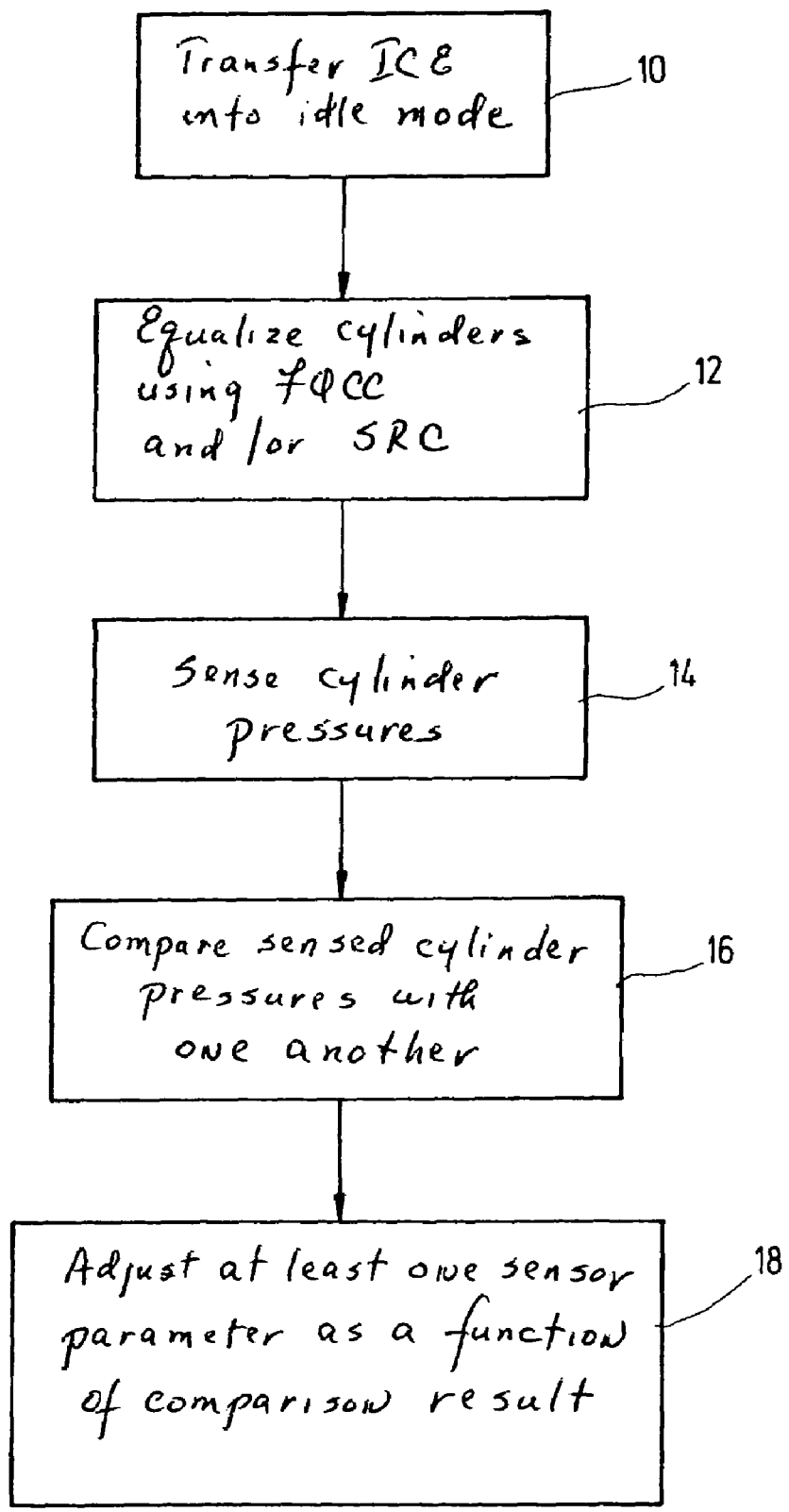
FIG. 1 shows a flowchart of first exemplary embodiment of the calibration method according to the present invention.

FIG. 1 shows a first exemplary embodiment of a method according to the present invention for calibrating pressure sensors disposed in the cylinders (combustion chambers) of an internal combustion engine (ICE) of a motor vehicle, with reference to which the basic concept of the invention is to be illustrated.

The routine, or the method, shown starts with the ICE being transferred, in accordance with step 10, into an operating state in which very high cylinder equalization accuracy can be achieved by a fuel quantity compensation control system (FQCC) and/or a smooth-running control system (SRC). This transfer occurs, in a conventional manner, by an electronic engine control system. An operating state of this kind represents, in the present case, operation of the ICE at zero load at idle rotation speed (idle mode), since side effects disruptive to the FQCC and/or SRC, for example crankshaft torsional vibrations or air mass fluctuations, are minimized in this operating state.

In the idle mode, according to step 12, an equalization of the individual cylinders of the ICE is then performed, in a conventional manner, by the FQCC and/or SRC. The result of this equalization is that all the cylinders deliver the same effective mean pressure pme. If the frictional mean pressure pmR is then considered, as a simplification, to be the same for all cylinders, the result is then, for all cylinders, the same indicated mean pressure pmi, which is made up of an effective mean pressure pme and the frictional mean pressure according to the equation pmi=pme+pmR, is then obtained for all cylinders. The indicated mean pressure pmi can moreover be calculated, in a conventional manner, from the respective cylinder pressure. Differences in the calculated pmi values of the various cylinders can therefore be attributed only to erroneous sensor characteristic curves, in particular to an erroneous gain factor. In addition, an offset of the sensor characteristic curves can also, at least in part, contribute to causing such a discrepancy.

It should be noted here that the correction of the offset value described initially and known in the existing art is referred to the sensor characteristic curve U=f(p). In contrast thereto, the offset correction shown in FIG. 3 refers to the characteristic curve of the parameters pmi=f(me). An offset error in the sensor characteristic curve U=f(p) has no effect on the calculated pmi value. Offset discrepancies in the characteristic curves pmi=f(me), on the other hand, are based not on sensor errors but on differences in mean frictional pressure, with the prerequisite that an ideal adjustment of the effective mean pressures can be performed, and that the aforesaid slopes have already been adjusted.

Figure 2:
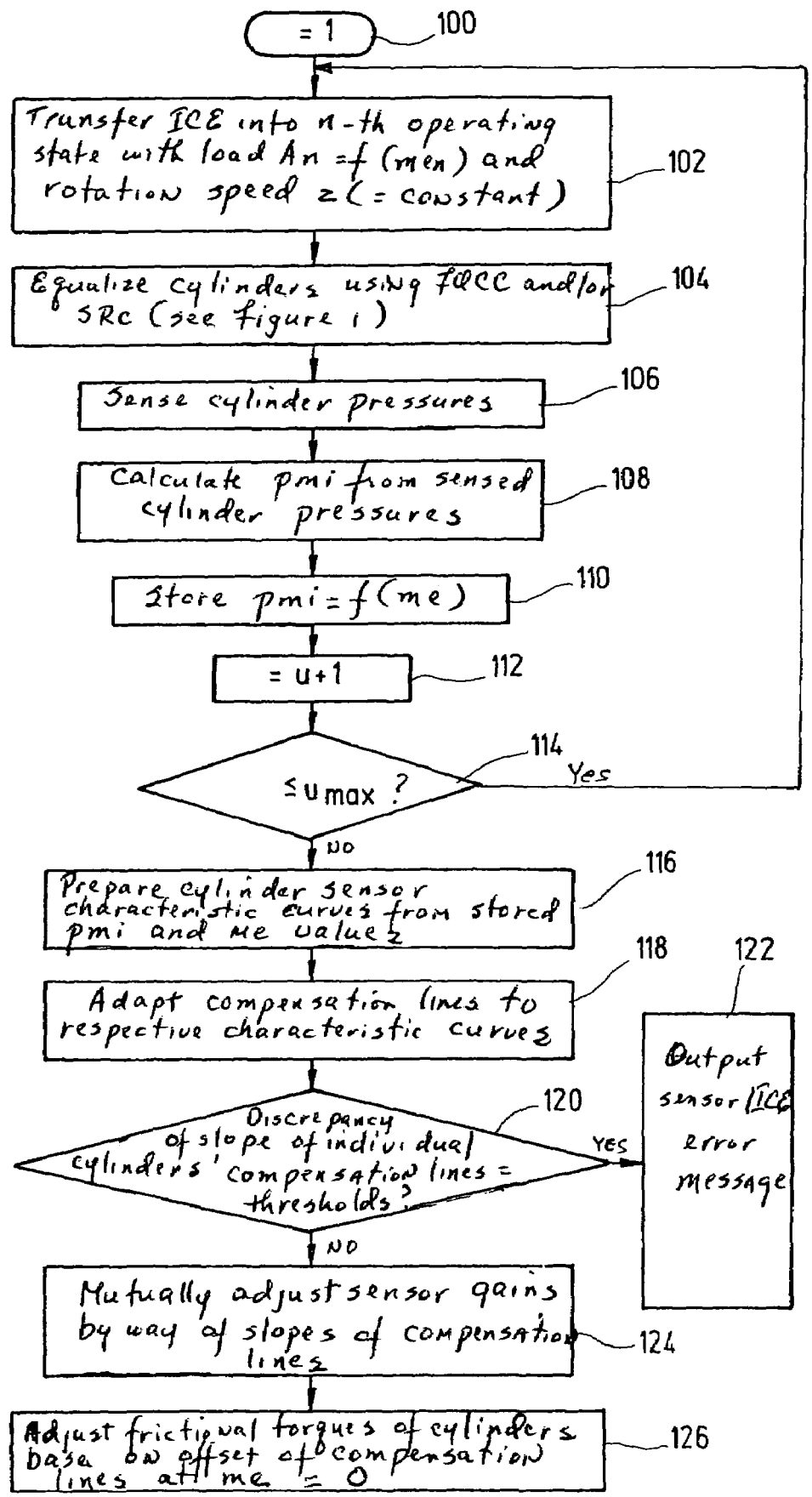
FIG. 2 shows a flowchart of second exemplary embodiment of the invention.

In the present exemplary embodiment, the cylinder pressure curves acquired in step 14 are compared in step 16 and, using the result of that comparison, the individual sensor parameters are adjusted to one another in step 18. Alternatively, other operating parameters of the ICE can also be used to adjust the sensor parameters/characteristic curves. As illustrated in FIG. 2, the adjustment can also be performed by equating the aforesaid calculated pmi values.

It should be noted that in the exemplary embodiment described above in connection with FIG. 1, for technical simplification the adjustment is accomplished at only a single operating point of the ICE, whereas in the exemplary embodiment depicted in FIG. 2, at least two operating points must be arrived at. The latter variant nevertheless allows a higher calibration quality. In the embodiment illustrated in FIG. 1, however, a filtering operation, e.g., averaging over several operating cycles of the ICE, can additionally be provided in order to reduce the influence of stroke-to-stroke variations in the cylinders of the ICE.

FIG. 2 depicts a second exemplary embodiment, in which the sensor characteristic curves are adjusted at several operating points of the ICE, i.e., in the present case at several loads at constant rotation speed. By taking into account the aforesaid offset in the sensor characteristic curves, it is possible to take into account different frictional torques or frictional mean pressures pmR of the individual cylinders that are attributable, for example, to different compression conditions in the individual cylinders.

The procedure depicted in FIG. 2 starts in step 100 with initiation of a counter n=1. In step 102, the ICE is transferred into an n-th operating state, i.e., in the present case firstly into a first operating state. This first operating state is characterized by a load that depends on the injection quantity me at that operating point (mel) and by a rotation speed z that is hereafter assumed to be constant. At this first operating point of the ICE, in step 104 an equalization of the cylinders with one another by means of FQCC/SRC, as described with reference to FIG. 1, is performed. Once the cylinders have been equalized, the pressures present in the cylinders are sensed in step 106 by the pressure sensors, and from the sensed pressure values, the torques or mean pressures pmi indicated respectively in the cylinders are calculated in step 108.

The number tuples (pmi, me) that now exist are then temporarily stored in step 110. The counter n is then incremented in step 112 by one, and checked in step 114 to determine whether the incremented value of n is less than an upper limit n_max. Depending on the result of this comparison, execution either branches back to step 102 or proceeds further. The limit n_max thus defines how often the loop from 102 through 110 is repeated, i.e., how many different operating points of the ICE are arrived at (load A2 at me2, load A3 at me3, etc.) and how many of the aforementioned number tuples are stored.

If the upper limit n_max is exceeded, sensor characteristic curves (FIG. 3) for the individual cylinders are prepared in step 116 from the temporarily stored number tuples (pmi, me). Compensation lines are adapted in step 118 to the individual measurement points of the characteristic curves using the method of least error squares. In step 120, the slopes of these compensation lines are compared with one another, and respective discrepancies between them are calculated. If at least one of these discrepancies is greater than a threshold value that is to be ascertained empirically, then in the present exemplifying embodiment an error message is outputted in step 122 concerning the function of the sensor suite and/or of the ICE itself. Step 122 is optional.

If the assumption used here, to a first approximation, is a constant frictional torque or frictional mean pressure pmR in the individual cylinders, the sensor gain can then be interpreted as the slope of the compensation lines. What is obtained as the constant frictional torque or frictional mean pressure pmR is then the offset of the compensation lines for me=0.

If the value is below the aforesaid threshold value, an adjustment of the sensor parameters can be accomplished. In step 124 the gain factors of the individual pressure sensors are adjusted to one another by adapting the slopes of the compensation lines. The curve or line adaptation automatically, by the aforesaid offset of the compensation lines, also causes the frictional torques or frictional mean pressures of the cylinders to be adjusted to one another in step 126.

As an alternative to the linear function formulation pmi=f(me) described above for the sensor parameters, higher-order polynomial functions can also be taken as the basis. This allows consideration, in particular, of a frictional torque or frictional mean pressure pmR that changes with load.

In a further exemplary method, a plausibility check of the ascertained sensor parameters, in particular of the ascertained gain factors, is additionally performed. This makes it additionally possible, as in step 122 in FIG. 2, to detect possible functional defects in one or more of the pressure sensors or even defects in the ICE itself, but with a higher quality as compared with FIG. 2.

Figure 3:
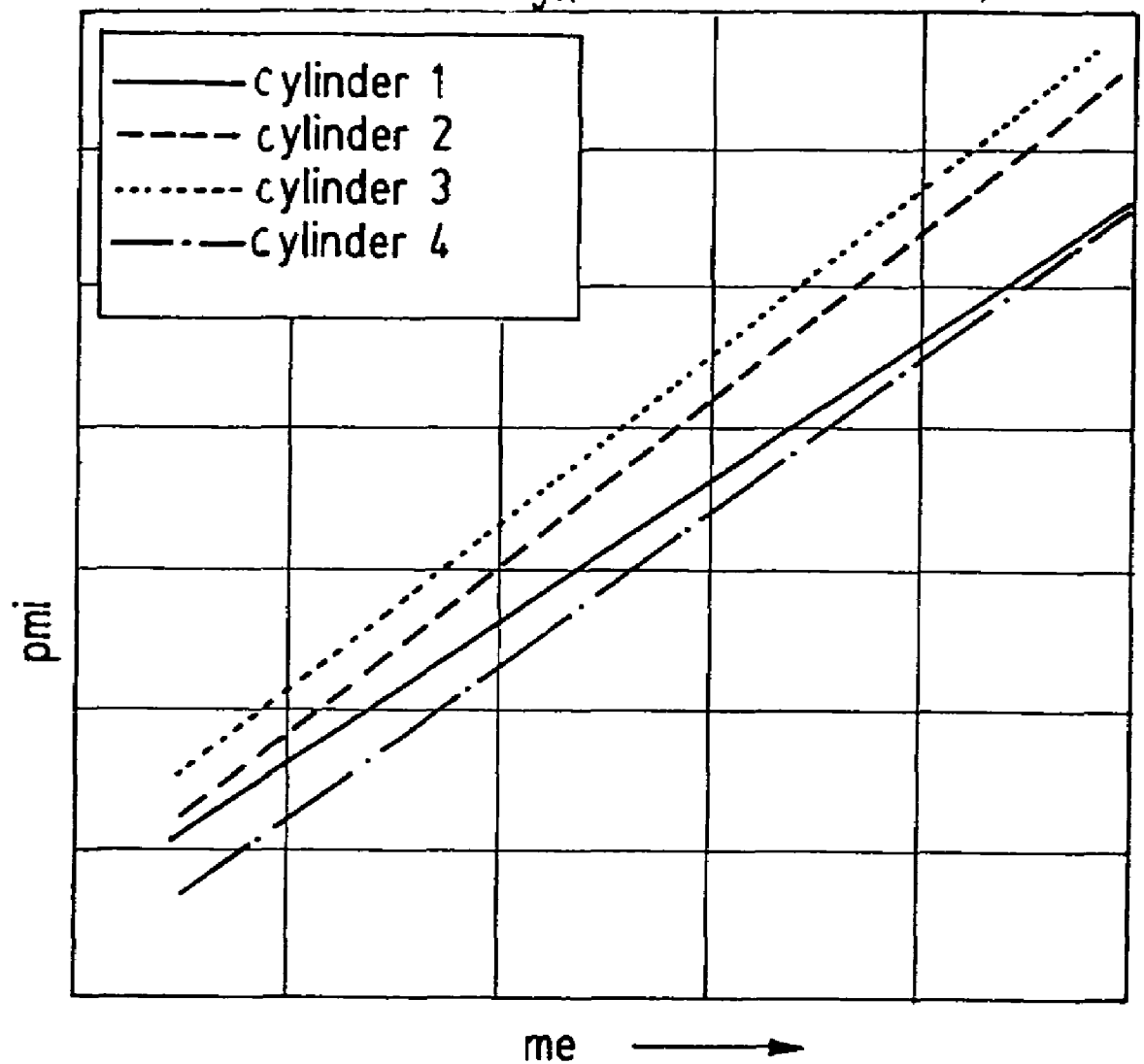
FIG. 3 shows sensor characteristic curves that are typically present after a cylinder equalization by means of FQCC/SRC in an internal combustion engine having four cylinders.

Lastly, FIG. 3 shows the sensor characteristic curves typically obtained after a cylinder equalization by FQCC and SRC. Here the indicated torque or mean pressure pmi calculated from the pressure values sensed in each cylinder is plotted against the injection quantity me measured at three different operating points of the ICE. Compensation lines have already been adapted to the measurement points using the method of least error squares. The gain factor of the respective pressure sensors is derived directly from the slope of these lines. As is apparent, one of the three characteristic curves visibly deviates from the other characteristic curves in terms of its slope. It is precisely in the case of this line that an adjustment in accordance with the aforementioned method results in distinctly better calibration of the sensors with respect to one another.

It is understood that the present invention is applicable not only to ICEs having combustion chambers of cylindrical shape, but to ICEs of any kind, e.g., Wankel engines, having at least two combustion chambers. It is also understood here that the invention is usable not only in the context of the pressure sensors described above, but in principle with any sensors that are necessary for individual-cylinder operation of the ICE, i.e., suitable for sensing a variable that directly or indirectly characterizes the combustion process in the cylinders, for example injection quantity sensors or the like.

What is claimed is:

1. A method for calibrating at least two sensors for sensing a variable characterizing a combustion process in an internal combustion engine of a motor vehicle having at least two cylinders, the method comprising:
   determining at least one operating point of the internal combustion engine;
   performing, at the at least one operating point of the internal combustion engine, the equalization of the at least two cylinders by the at least one fuel quantity equalization method;
   mutually adjusting, after the equalization of the at least two cylinders, at least one sensor parameter of the at least two sensors,
   wherein the variable characterizes the combustion process in a respective cylinder, and wherein the variable represents a pressure;
   calculating one of torques indicated in the at least two cylinders and mean pressures indicated in the at least two cylinders from the corresponding variables sensed from the at least two sensors; and
   determining, from one of a difference between the torques and a difference between the mean pressures indicated in the at least two cylinders, one of an erroneous sensor parameter and an erroneous sensor characteristic curve,
   wherein the adjustment of the at least one sensor parameter is accomplished by one of equating the torques indicated in the at least two cylinders and equating the mean pressures indicated in the at least two cylinders, and
   wherein the adjustment of the at least one sensor parameter is performed at a single operating point of the internal combustion engine.

2. The method as recited in claim 1, further comprising:
   performing a filtering operation for the adjustment of the at least one sensor parameter, wherein the filtering operation includes averaging over at least two operating cycles of the internal combustion engine.

3. A method for calibrating at least two sensors for sensing a variable characterizing a combustion process in an internal combustion engine of a motor vehicle having at least two cylinders, the method comprising:
   determining at least one operating point of the internal combustion engine;

performing, at the at least one operating point of the internal combustion engine, the equalization of the at least two cylinders by the at least one fuel quantity equalization method;

mutually adjusting, after the equalization of the at least two cylinders, at least one sensor parameter of the at least two sensors, wherein the variable characterizes the combustion process in a respective cylinder, and wherein the variable represents a pressure;

calculating one of torques indicated in the at least two cylinders and mean pressures indicated in the at least two cylinders from the corresponding variables sensed from the at least two sensors; and determining, from one of a difference between the torques and a difference between the mean pressures indicated in the at least two cylinders, one of an erroneous sensor parameter and an erroneous sensor characteristic curve, wherein for each cylinder, the indicated torque is derived from the sum of an effective torque and a frictional torque, and the indicated mean pressure is derived from the sum of an effective mean pressure and a frictional mean pressure, the frictional torques and the frictional mean pressures for the at least two cylinders being assumed to be constant for the calculation of the indicated torque and the indicated mean pressure, and wherein a respective gain factor for each sensor is derived from the slope of a corresponding sensor characteristic curve defined by a plurality of values of one of indicated torques and indicated mean pressures, and wherein an offset is derived from one of a difference between the frictional torques of the at least two cylinders and a difference between the frictional mean pressures of the at least two cylinders.

4. The method as recited in claim 3, further comprising: determining a malfunction of at least one of the two sensors and the internal combustion engine, based on a discrepancy between the sensor characteristic curves.

5. The method as recited in claim 3, wherein for each cylinder, the indicated torque is calculated from a polynomial representing the effective torque and the frictional torque, and the indicated mean pressure is calculated from a polynomial representing the effective mean pressure and the frictional mean pressure, and wherein the respective gain factor is derived from a computational curve matching of the sensor characteristic curves.

6. The method as recited in claim 5, wherein one of the frictional torque and the frictional mean pressure, used in the calculation of one of the indicated torque and the indicated mean pressure, varies as a function of the load of the internal combustion engine 7. A method for calibrating at least two sensors for sensing a variable characterizing a combustion process in an internal combustion engine of a motor vehicle having at least two cylinders, the method comprising:

performing, at at least one operating point of the internal combustion engine, an equalization of the at least two cylinders by the at least one fuel quantity equalization method; and mutually adjusting, at the at least one operating point of the internal combustion engine and after the equalization of the at least two cylinders, at least one sensor parameter of the at least two sensors.

8. The method as recited in claim 7, wherein the variable characterizes the combustion process in a respective cylinder, and wherein the variable represents a pressure.

9. The method as recited in claim 7, wherein the at least one sensor parameter includes at least one of an offset and a gain factor of a sensor characteristic curve.

10. The method as recited in claim 7, wherein for the adjustment of the at least one sensor parameter, operating points of the internal combustion engine are selected where small disturbing effects as a result of operation of the internal combustion engine are to be expected.

11. The method as recited in claim 8, further comprising:
calculating one of torques indicated in the at least two cylinders and mean pressures indicated in the at least two cylinders from the corresponding variables sensed from the at least two sensors; and determining, from one of a difference between the torques and a difference between the mean pressures indicated in the at least two cylinders, one of an erroneous sensor parameter and an erroneous sensor characteristic curve.

12. The method as recited in claim 11, wherein the adjustment of the at least one sensor parameter is accomplished by one of equating the torques indicated in the at least two cylinders and equating the mean pressures indicated in the at least two cylinders.

13. The method as recited in claim 11, wherein the adjustment of the at least one sensor parameter is accomplished by adjusting at least one operating parameter of the internal combustion engine.

14. The method as recited in claim 11, wherein the adjustment of the at least one sensor parameter is performed at at least two operating points of the internal combustion engine.

15. The method as recited in claim 14, wherein the adjustment of the at least one sensor parameter is performed at at least two load points, and wherein the internal combustion engine is at a constant rotation speed at each load point.

16. The method as recited in claim 12, further comprising:
performing a plausibility check of the at least one sensor parameter.

17. The method as recited in claim 7, wherein the at least one operating point is an idle mode of the internal combustion engine.

* * * * *